UNITED STATES PATENT OFFICE.

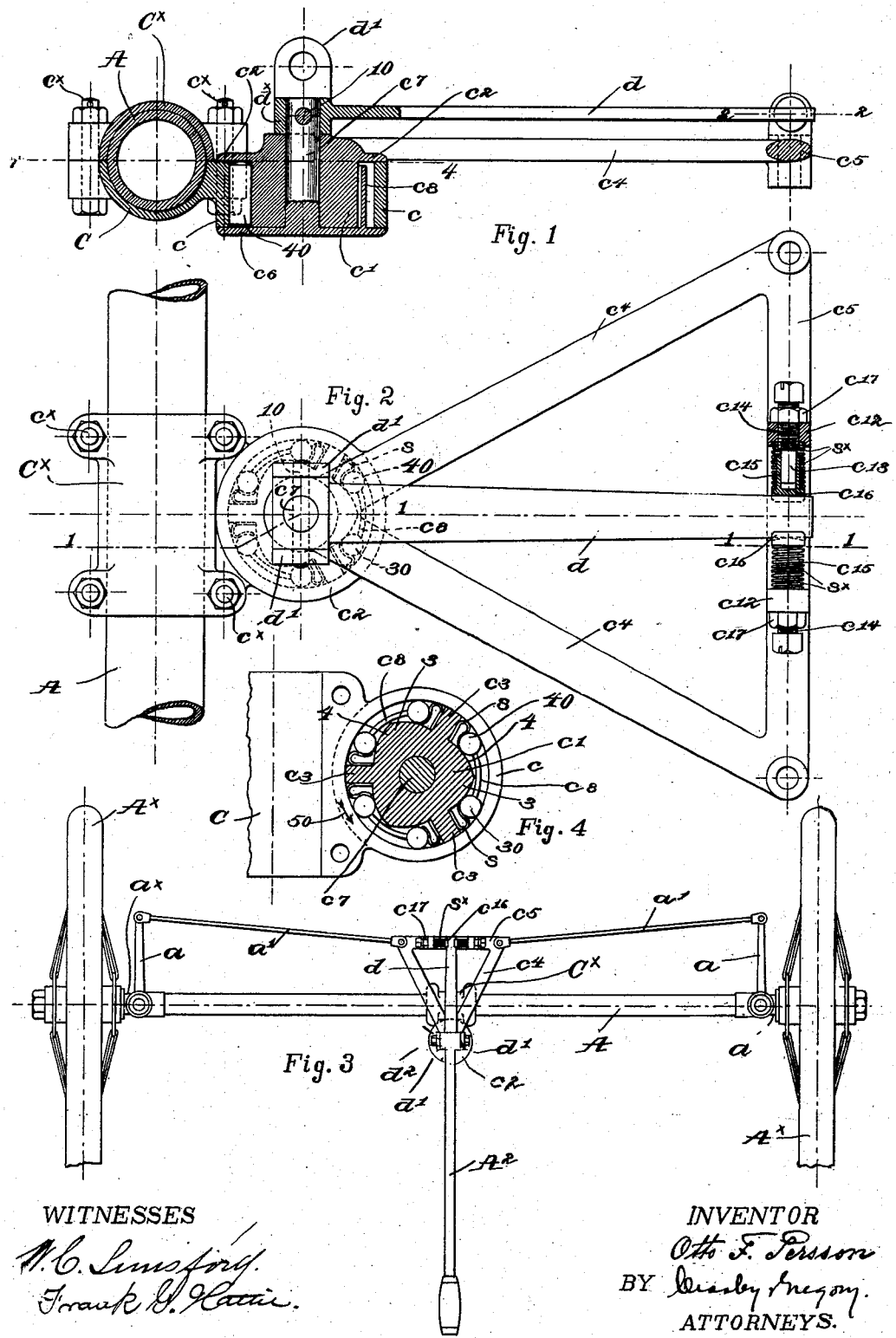

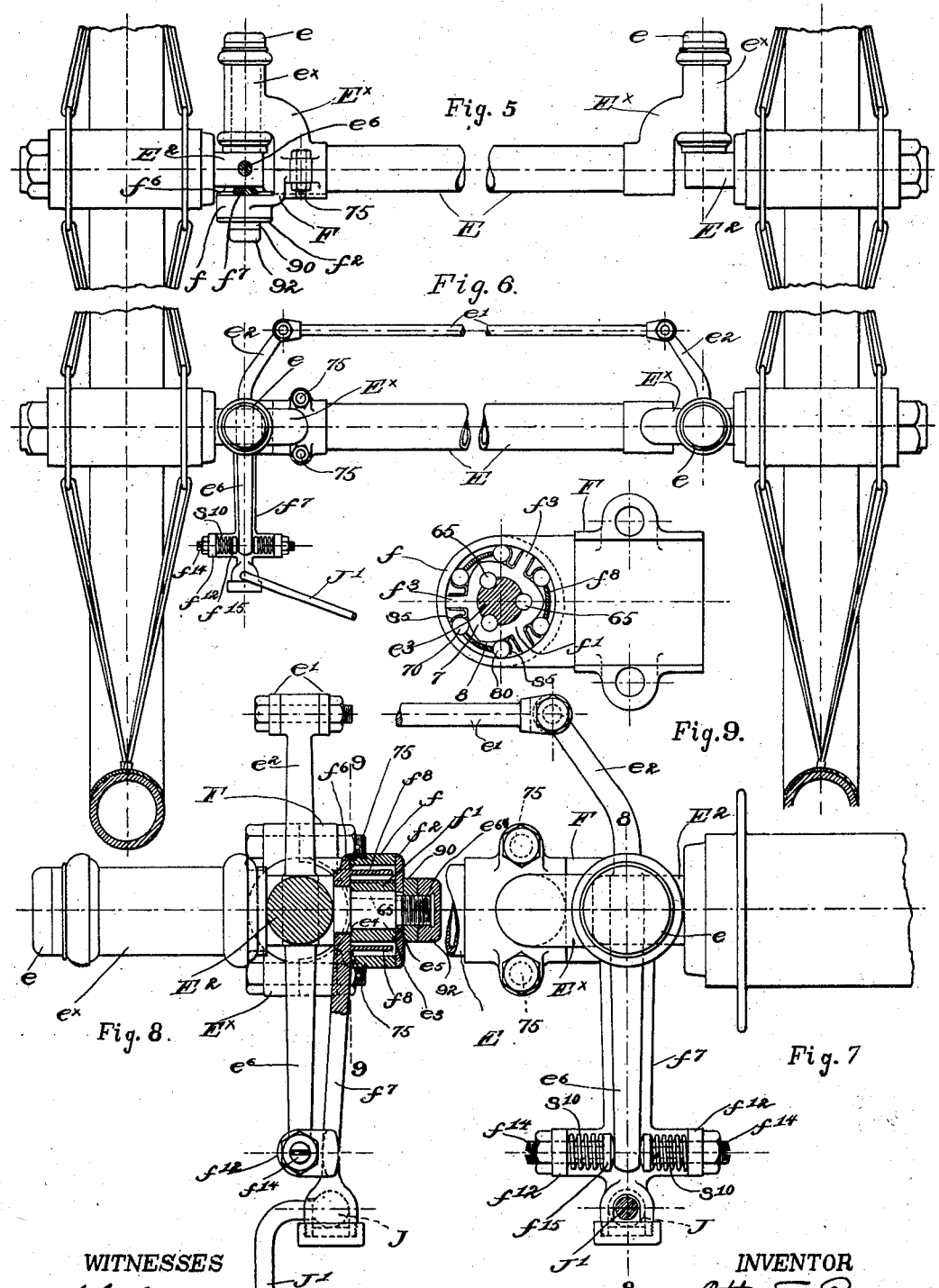

OTTO F. PERSSON, OF LYNN, MASSACHUSETTS, ASSIGNOR TO ELIHU THOMSON, OF SWAMPSCOTT, MASSACHUSETTS.

STEERING DEVICE FOR MOTOR-VEHICLES.

SPECIFICATION forming part of Letters Patent No. 693,330, dated February 11, 1902.

Application filed February 19, 1900. Serial No. 5,730. (No model.)

*To all whom it may concern:*

Be it known that I, OTTO F. PERSSON, of Lynn, county of Essex, State of Massachusetts, have invented an Improvement in Steering Apparatus, of which the following description, in connection with the accompanying drawings, is a specification, like characters on the drawings representing like parts.

This invention has for its object the production of novel steering apparatus wherein the steering member is changed as to its position by or through a suitable controller, means being provided to lock the steering member automatically in any given position, the operation of the controller releasing the locking means and also serving to change the position of the steering member.

My invention is applicable to any form of vehicle with which a steering member coöperates to direct its course, irrespective of the nature of the medium on which the vehicle travels; but I have herein chosen to illustrate my invention as practically embodied in steering apparatus for automobile vehicles as affording a wide field for usefulness. It has been found by the users of such vehicles that when the steering wheel or wheels, which I have hereinafter included in the comprehensive term "steering member," strikes an obstruction—such as a stone, rut, or hillock—there is a very great tendency to violently and suddenly turn the steering member out of its previous position and through its connection with the steering-handle or controller to tear the latter from the grasp of the operator. In such event control of the vehicle is momentarily lost, and serious accidents have resulted therefrom before the operator could regain control and return the vehicle to its proper course. The use of a worm and worm-gear between the controller and the steering member has been proposed; but it is slow and cumbersome in operation and requires undue power to operate it, and, furthermore, lacks in sensitiveness and delicacy of action.

In my present invention I have provided rapidly-acting, sensitive, and powerful means for locking the steering member at any point in its path of movement, while at the same time the slight power required to move the controller instantly releases the locking means and maintains it released until the steering member has assumed its new position.

Figure 1 is a part sectional view on the lines 1 1, Fig. 2, of one form of steering apparatus embodying my invention. Fig. 2 is a top or plan view thereof and partly in section on the line 2 2, Fig. 1. Fig. 3 is a top or plan view, on a smaller scale, showing the application of such embodiment of my invention to the steering-wheels of an automobile vehicle. Fig. 4 is an enlarged sectional detail of the locking means, taken on the line 4 4, Fig. 1. Fig. 5 is a part front elevation, centrally broken out, of the steering axle and wheels of a vehicle, illustrating another embodiment of my invention, the controller being omitted. Fig. 6 is a top or plan view thereof, also centrally broken out, but showing some of the parts omitted in Fig. 5. Fig. 7 is an enlarged detail plan view of the locking means, such as shown in Figs. 5 and 6, but applied to the right-hand wheel-spindle. Fig. 8 is a part sectional view of the locking means on the line 8 8, Fig. 7; and Fig. 9 is a section on the line 9 9, Fig. 8, showing the internal structure of the locking means.

For convenience in illustration and description I have chosen to present my invention as applied, in its practical embodiment, to the steering-gear of an automobile vehicle, and in Fig. 3 the steering-axle A is shown as provided at its ends with pivotally-supported spindles $a^\times$ for the hubs of the steering-wheels $A^\times$, the spindles having attached arms $a$ set at an angle thereto, the swinging of the spindles on their fulcra changing the position of the steering-wheels in well-known manner and directing the path of movement of the vehicle.

In Figs. 1 to 4 I have shown one form of positively-operating locking means interposed between the steering member—*i. e.*, the steering-wheels and the controller—shown in Fig. 3 as an angularly-movable or laterally-swinging arm $A^2$, which is usually brought up into position to be conveniently held by the operator of the vehicle. A clamp-collar C $C^\times$ is herein shown as rigidly secured to the axle A at its center by suitable bolts $c^x$, which secure the parts of the collar together and clamped in position, the member C having rigidly secured to or forming part of it an open ring or annular member $c$, forming a part of the locking means. Within this ring and movable relatively thereto is mounted a hub-like cam member $c'$, herein shown as having at its upper end a laterally-extended flange $c^2$, which rests upon and is supported by the upper end of the annulus $c$. Herein the periphery of the member $c'$ is provided with three projections $c^3$, Figs. 2 and 4, which extend substantially to the inner circumference of the fixed member $c$. The periphery of the member $c'$ between said projections is divided into pairs of opposite cam-faces 3 4 to coöperate with pairs of preferably hardened-steel locking-dogs (shown as rolls 30 40) interposed between the members $c$ and $c'$, a pair of dogs between each two projections $c^3$. Suitable springs $s$ tend to move the dogs of a pair toward each other, and referring to Fig. 4 it will be manifest that ordinarily rotative movement of the member $c'$ will at once be resisted by one or other dog of a pair, the locking means acting as a friction-clutch, the space between the members $c$ and $c'$ decreasing from adjacent a projection $c^3$ to the intersection of a pair of cam-faces 3 4. The movable member $c'$ is herein shown as having a rigidly-attached radial arm $c^4$, (represented as bifurcated, Fig. 2, and connected by a cross-piece $c^5$,) the triangular arm thus formed being pivotally connected by links $a'$ with the spindle-arms $a$, so that rotative movement of the member $c'$ will correspondingly change the position of the steering member.

Referring to Fig. 1, a disk $c^6$ is applied to the bottom of the member $c$, a rigidly-attached stud $c^7$ on said disk being extended freely up through a suitable hole in the center of the member $c'$ and entering the head $d^x$ of a radial arm $d$, to which the stud is secured, as by a pin 10, the head resting on the top of the member $c'$, and the disk $c^6$ and flange $c^2$ will be held securely in position on the annulus $c$ by the stud and pin described. I have shown the disk $c^6$ as provided with upturned projections $c^8$, made segmental in shape to enter between the fixed and movable members $c$ $c'$ of the locking means and interposed between the several pairs of locking-dogs 30 40, as clearly illustrated in Fig. 4. If now the disk be rotated in the direction of arrow 50, Fig. 4, the projections $c^8$, which constitute releasing devices, will press the dogs 40 against their springs into inoperative position, unlocking the member $c'$, which can be rotated in the same direction, while reverse movement of the disk renders dogs 30 inoperative, and the member $c'$ can be turned opposite arrow 50, such rotative movement operating the steering member, as described. The head $d^x$ is shown as provided with upturned ears $d'$, between which the controller $A^2$ is mounted and secured by a pivot $d^2$, and rotative movement of the controller about the stud $c^7$ as a center will release the locking means and also swing the arm $d$. It will thus be seen that relative movement of the arms connected with the movable member $c'$ of the locking means and the releasing device, respectively, releases the locking means, and consequently permits the position of the steering member to be changed, and obviously if said arms are thereafter moved in unison the member $c'$ will be rotated and the steering-wheels adjusted as desired. The cross-bar $c^5$ is provided with transverse lugs $c^{12}$ at opposite sides of its center to receive headed studs $c^{13}$, threaded for a portion of their length at $c^{14}$, Fig. 2, to engage threaded holes in the lugs, sleeves $c^{15}$ sliding loosely on the inner ends of the studs and having notched heads $c^{16}$ to receive between them the arm $d$ of the releasing device. Springs $s^x$ of equal strength are interposed between the heads and the lugs to normally self-center the arm between the lugs with the releasing projections $c^8$ in mid or inoperative position, the sleeves $c^{15}$ having longitudinal play on the studs, which latter are held in adjusted position in the lugs by suitable check-nuts $c^{17}$, adjustment of the studs regulating the relative movement of the arms $d$ $c^4$ by or through the yielding stops or sleeves $c^{15}$. Now when the controller $A^2$ is swung laterally the arm $d$ moves therewith until stopped by one of the stops $c^{15}$, the locking means having been released, as described, and thereafter the arm $c^4$ will be moved in unison with the controller and with arm $d$ and the steering member will be changed in position. As soon as the pressure upon the controller is relaxed, the arm $d$ will be centered by the springs $s^x$ relatively to the arm $c^4$, and the locking-dogs described will instantly operate, and the steering member will be locked positively in its new position and maintained in such position until the controller is again manipulated, as described. Initial movement of the controller to steer thus releases the locking means, and continued movement thereafter changes the position of the steering member, the unlocking and automatic locking being effected rapidly and positively, while there is practically no more effort required to operate the controller when my invention is employed than when such a device is not used. After the locking means has been released the strain due to changing the position of the steering member is not transmitted through the locking means, but is entirely independent thereof.

In Figs. 5 and 6 I have shown the locking means as differently applied, though its general construction and mode of operation are the same, the steering-axle E having secured to its ends arched brackets $E^x$, which provide long upright bearings $e^x$ for the fulcra of the steering-wheel spindles $E^2$, suitable nuts $e$ retaining the fulcra in their bearings. Arms $e^2$ extend substantially horizontally from the spindles at an angle thereto and are shown in Fig. 6 as connected by a link or connecting-rod $e'$, jointed at its ends to the spindle-arms. One of the brackets $E^\times$ is made in two parts, connected and clamped on the axle by suitable bolts 75, the lower part F having an open annular portion or ring $f$, through which a downward extension $e^3$ of the adjacent spindle-fulcrum is passed. A cam-hub $f'$ is secured to this fulcrum $e^3$ in any suitable manner, as by keys 65, Fig. 9, said hub having radial projections $f^3$ and pairs of opposite cam-faces 7 8, with coöperating locking-dogs 70 80 and their springs $s^5$, all substantially as described and operating similarly. The fulcrum $e^3$ is shouldered at $e^4$, one end of the hub abutting against it, and near its lower end a second shoulder $e^5$ supports a disk $f^2$, which is clamped against the cam-hub $f'$ by means of lock-nuts 90 92, screwed onto the threaded portion $e^{60}$ of the fulcrum, the disk rotating upon the lower end of the ring $f$, which forms the fixed member of the locking means. A disk $f^6$, centered on said fulcrum above the hub $f'$, which is the movable member of the locking means, has an attached arm $f^7$ and segmental releasing projections $f^8$ interposed between the pairs of locking-dogs 70 80 and between the fixed and movable members $f f'$, (see Fig. 9,) said disk $f^6$ and the attached parts having a slight rotative movement relative to the member $f'$ and the spindle-fulcrum $e^3$. The latter has a rigidly-connected arm $e^6$, the free end of which extends between the yielding stop-sleeves $f^{15}$, mounted on adjustable studs $f^{14}$, held in lugs $f^{12}$ on the arm $f^7$, springs $s^{10}$ acting on the stops to take up shock and to normally center the arm $f^7$ relatively to arm $e^6$ to thereby normally maintain inoperative the releasing device for the locking means, the arm $f^7$ in this construction having thus a limited yielding and adjustable movement relative to the arm $e^6$.

In Figs. 6 and 7 the end of the arm $f^7$ is extended laterally to form a T-shaped portion on which the lugs $f^{12}$ are erected.

It is to be noted that Figs. 5 and 6 show the locking device coöperating directly with the left-hand wheel-spindle, while Figs. 7 and 8 refer to the right-hand spindle, such change being made merely in order that the arrangement of the figures could be effected without crowding. The arm $f^7$ is connected by a suitable joint J with a link $J'$, the latter being jointed at its other end with the usual steering-head or controller, movement of the latter swinging the arm $f^7$ first to release the locking means and thereafter to move the arms $f^7$ $e^6$ in unison to change the position of the steering member.

From the foregoing it will be obvious that the two modes or applying the locking means do not alter the manner of operation thereof or the essential construction of such locking means. I have shown the cam member of said means as provided with three pairs of opposing cam-faces and a corresponding number of locking-dogs; but it will be obvious that a greater or less number may be employed without in any manner departing from the spirit and scope of my invention.

Various changes and modifications may be made in the construction and arrangement herein shown and described, as I have shown one practical embodiment of my invention, without attempting to illustrate various modifications thereof within the spirit and scope of my invention.

Having described my invention, what I claim as new, and desire to secure by Letters Patent, is—

1. Pivotally-mounted steering-wheel spindles, a controller therefor having a swinging movement, locking means, comprising a fixed annular member, a concentric rotatable double-cam member having a rigidly-attached radial arm, a plurality of oppositely-acting locking-dogs interposed between the members, springs to maintain them operative, a device concentric with the cam member to render one or other dog inoperative, a radial arm on said device, one of said arms being operatively connected with the spindles and the other with the controller, and means on one arm to limit movement of the other relative thereto, relative movement of the arms releasing the cam member, and movement in unison rotating the cam member to change the position of the spindles.

2. Pivotally-mounted steering-wheel spindles, a controller therefor having a swinging movement, locking means comprising a rotatable hub having a pair of opposite cam-faces and a rigidly-attached radial arm, a fixed inclosing ring, rolls interposed between the cam-faces and ring, springs to move said rolls into locking position, an arm pivoted concentrically with the hub and having a releasing projection interposed between the rolls, one arm being operatively connected with the spindles and the other with the controller, and means on one arm to limit relative movement of the other and to normally center the releasing projection between the rolls, steering movement of the controller causing relative movement of the arms to release the cam-hub, and subsequently moving the arms in unison to rotate said hub and change the position of the wheel-spindles.

3. Pivotally-mounted steering-wheel spindles, each having an arm extended at an angle thereto, locking means comprising a fixed and a rotatable double-cam member, a plurality of interposed oppositely-acting locking-dogs interposed between them and normally maintained in operative position, a radial arm rigidly connected with the movable member, a releasing device to render one or the other dog inoperative and having an attached arm, connections between one of said arms and the spindle-arms, a manually-operative controller operatively connected with the other arm, and adjustable means on one arm to yieldingly limit movement of the other arm relatively thereto, and to normally maintain the releasing device inoperative, steering movement of the controller unlocking and permitting movement of the rotative cam member in one direction to thereby change the position of the spindles.

4. Pivotally-mounted steering-wheel spindles, a manually-operated controller therefor having a swinging movement to steer, a fixed ring, an inclosed hub having a plurality of pairs of opposite cam-faces, and a radial projection between each pair, and an attached arm, pairs of rolls interposed between the ring and each pair of cam-faces, springs to normally maintain the rolls operative, a series of connected segmental projections interposed respectively between each two rolls and having an attached arm, the wheel-spindles being operatively connected with one and the controller with the other of said arms, and means to permit a predetermined relative movement of one arm relatively to the other, and to normally place the releasing segments in inoperative position, steering movement of the controller in either direction releasing one set of rolls and permitting rotation of the cam-hub in the same direction by continued movement of the controller, to change the position of the wheel-spindles.

5. Pivotally-mounted steering-wheel spindles, a controller therefor having a swinging movement, locking means, comprising a fixed annular member, a concentric rotatable double-cam member having a rigidly-attached arm, a plurality of oppositely-acting locking-dogs interposed between the said members, springs to maintain them normally operative, a releasing device to render one or other of the dogs inoperative, an actuating-arm connected with said releasing device, one arm being operatively connected with the spindles and the other with the controller, and adjustable oppositely-located yielding stops on one arm to engage the other arm and permit a limited yielding relative movement thereof and also serving to normally center the releasing device relatively to the dogs, relative movement of the arms releasing the cam member, and movement in unison rotating said member to change the position of the spindles.

6. A steering-axle, wheel-spindles pivotally mounted thereon, a controller, a self-locking friction-clutch having its fixed portion rigid with the axle, a movable member, and a releasing member, one of said members being operatively connected with the wheel-spindles and the other member with the controller, and means to permit a limited relative movement of said members to release the clutch, subsequent movement of said members acting through said means to swing the spindles independently of the clutch.

7. A steering-axle, wheel-spindles pivotally mounted thereon, a controller, a self-locking clutch having its fixed portion rigid with the axle, a movable member, a releasing member, one being operatively connected with the adjacent wheel-spindle and the other with the controller, and means to permit a limited relative movement of said members to release the clutch, subsequent movement of said members acting through said means to swing the spindles independently of the clutch.

8. A steering-axle, wheel-spindles pivotally mounted thereon and connected to swing together, a controller therefor, a self-locking clutch applied to one of said spindles, to maintain it normally locked relatively to the axle, and a releasing device operated by the controller, to release the clutch when desired, and connections between the controller and the spindles, to swing the latter independently of the clutch when the same is released.

In testimony whereof I have signed my name to this specification in the presence of two subscribing witnesses.

OTTO F. PERSSON.

Witnesses:
 JOHN C. EDWARDS,
 AUGUSTA E. DEAN.